US012084276B2

(12) United States Patent
Koga et al.

(10) Patent No.: US 12,084,276 B2
(45) Date of Patent: *Sep. 10, 2024

(54) CONTROL SYSTEM FOR A REFUSE VEHICLE

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Nader Nasr, Neenah, WI (US); Chad K. Smith, Omro, WI (US); Logan Gary, Oshkosh, WI (US); Derek A. Wente, Austin, MN (US); Shawn Naglik, Oshkosh, WI (US); Mike J. Bolton, Oshkosh, WI (US); Jacob Wallin, Oshkosh, WI (US); Quincy Wittman, Oshkosh, WI (US); Christopher J. Rukas, Oshkosh, WI (US); Dylan Hess, Oshkosh, WI (US); Jason Rice, Oshkosh, WI (US); Zhenyi Wei, Oshkosh, WI (US); Bashar Amin, Oshkosh, WI (US); Catherine Linsmeier, Oshkosh, WI (US); Joshua D. Rocholl, Rochester, MN (US); Dale Matsumoto, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 370 days.

This patent is subject to a terminal disclaimer.

(21) Appl. No.: 17/477,752

(22) Filed: Sep. 17, 2021

(65) Prior Publication Data

US 2023/0089417 A1 Mar. 23, 2023

Related U.S. Application Data

(63) Continuation of application No. 17/327,298, filed on May 21, 2021, now Pat. No. 11,136,187.

(Continued)

(51) Int. Cl.

| | |
|---|---|
| ***B65F 3/20*** | (2006.01) |
| ***B65F 3/02*** | (2006.01) |
| ***B65F 3/04*** | (2006.01) |

(52) U.S. Cl.

CPC .................. *B65F 3/20* (2013.01); *B65F 3/02* (2013.01); *B65F 3/04* (2013.01); *B65F 2003/025* (2013.01); *B65F 2003/0279* (2013.01)

(58) Field of Classification Search

CPC ........ B65F 2003/025; B65F 2003/0279; B65F 3/02; B65F 3/04; B65F 3/06; B65F 3/20

See application file for complete search history.

(56) References Cited

U.S. PATENT DOCUMENTS

| | | | |
|---|---|---|---|
| 3,559,825 | A | 2/1971 | Meyer et al. |
| 3,771,674 | A | 11/1973 | Clucker |

(Continued)

*Primary Examiner* — Babar Sarwar

(74) *Attorney, Agent, or Firm* — Foley & Lardner LLP

(57) ABSTRACT

A refuse vehicle includes a chassis, an energy storage device, a body, an electric power take-off system, and a disconnect. The energy storage device is supported by the chassis and is configured to provide electrical power to a prime mover. Activation of the prime mover selectively drives the refuse vehicle. The body is supported by the (Continued)

chassis and defines a receptacle for storing refuse. The electric power take-off system is positioned on the refuse vehicle, and includes a motor that is configured to drive a hydraulic pump to convert electrical power received from the energy storage device into hydraulic power. The disconnect is positioned between the energy storage device and the electric power take-off system and is configured to selectively decouple the electric power take-off system from the energy storage device.

20 Claims, 12 Drawing Sheets

Related U.S. Application Data

(60) Provisional application No. 63/084,364, filed on Sep. 28, 2020.

(56) References Cited

U.S. PATENT DOCUMENTS

| | | | | |
|---|---|---|---|---|
| 3,802,585 | A * | 4/1974 | Churchman | B65F 3/28 414/512 |
| 4,797,069 | A * | 1/1989 | Hartley | F04B 1/146 417/222.1 |
| 5,897,123 | A | 4/1999 | Cherney et al. | |
| 5,919,027 | A | 7/1999 | Christenson | |
| 5,934,858 | A | 8/1999 | Christenson | |
| 5,934,867 | A | 8/1999 | Christenson | |
| 5,938,394 | A | 8/1999 | Christenson | |
| 5,951,235 | A | 9/1999 | Young et al. | |
| 5,967,731 | A | 10/1999 | Brandt | |
| 5,984,609 | A | 11/1999 | Bartlett | |
| 6,033,176 | A | 3/2000 | Bartlett | |
| 6,062,803 | A | 5/2000 | Christenson | |
| 6,089,813 | A | 7/2000 | McNeilus et al. | |
| 6,105,984 | A | 8/2000 | Schmitz et al. | |
| 6,120,235 | A | 9/2000 | Humphries et al. | |
| 6,123,500 | A | 9/2000 | McNeilus et al. | |
| 6,210,094 | B1 | 4/2001 | McNeilus et al. | |
| 6,213,706 | B1 | 4/2001 | Christenson | |
| 6,224,318 | B1 | 5/2001 | McNeilus et al. | |
| 6,315,515 | B1 | 11/2001 | Young et al. | |
| 6,336,783 | B1 | 1/2002 | Young et al. | |
| 6,350,098 | B1 | 2/2002 | Christenson et al. | |
| 6,447,239 | B2 | 9/2002 | Young et al. | |
| 6,474,928 | B1 | 11/2002 | Christenson | |
| 6,516,914 | B1 | 2/2003 | Andersen et al. | |
| 6,565,305 | B2 | 5/2003 | Schrafel | |
| 6,757,597 | B2 | 6/2004 | Yakes et al. | |
| 6,882,917 | B2 | 4/2005 | Pillar et al. | |
| 6,885,920 | B2 | 4/2005 | Yakes et al. | |
| 7,070,382 | B2 | 7/2006 | Pruteanu et al. | |
| 7,164,977 | B2 | 1/2007 | Yakes et al. | |
| 7,277,782 | B2 | 10/2007 | Yakes et al. | |
| 7,284,943 | B2 | 10/2007 | Pruteanu et al. | |
| 7,302,320 | B2 | 11/2007 | Nasr et al. | |
| 7,357,203 | B2 | 4/2008 | Morrow et al. | |
| 7,379,797 | B2 | 5/2008 | Nasr et al. | |
| 7,392,122 | B2 | 6/2008 | Pillar et al. | |
| 7,439,711 | B2 | 10/2008 | Bolton | |
| 7,448,460 | B2 | 11/2008 | Morrow et al. | |
| 7,451,028 | B2 | 11/2008 | Pillar et al. | |
| 7,520,354 | B2 | 4/2009 | Morrow et al. | |
| 7,521,814 | B2 | 4/2009 | Nasr | |
| 7,556,468 | B2 | 7/2009 | Grata | |
| 7,559,735 | B2 | 7/2009 | Pruteanu et al. | |
| 7,689,332 | B2 | 3/2010 | Yakes et al. | |
| 7,711,460 | B2 | 5/2010 | Yakes et al. | |
| 7,756,621 | B2 | 7/2010 | Pillar et al. | |
| 7,831,352 | B2 * | 11/2010 | Laumer | B65F 3/06 700/285 |
| 7,848,857 | B2 | 12/2010 | Nasr et al. | |
| 7,878,750 | B2 | 2/2011 | Zhou et al. | |
| 7,931,103 | B2 | 4/2011 | Morrow et al. | |
| 7,937,194 | B2 | 5/2011 | Nasr et al. | |
| 8,000,850 | B2 | 8/2011 | Nasr et al. | |
| 8,139,109 | B2 | 3/2012 | Schmiedel et al. | |
| 8,182,194 | B2 | 5/2012 | Pruteanu et al. | |
| 8,191,363 | B2 * | 6/2012 | Laumer | F15B 13/0433 91/461 |
| 8,215,892 | B2 | 7/2012 | Calliari | |
| 8,333,390 | B2 | 12/2012 | Linsmeier et al. | |
| 8,337,352 | B2 | 12/2012 | Morrow et al. | |
| 8,360,706 | B2 | 1/2013 | Addleman et al. | |
| 8,540,475 | B2 | 9/2013 | Kuriakose et al. | |
| 8,561,735 | B2 | 10/2013 | Morrow et al. | |
| 8,807,613 | B2 | 8/2014 | Howell et al. | |
| 8,864,613 | B2 | 10/2014 | Morrow et al. | |
| 8,947,531 | B2 | 2/2015 | Fischer et al. | |
| 9,008,913 | B1 | 4/2015 | Sears et al. | |
| 9,045,014 | B1 | 6/2015 | Verhoff et al. | |
| 9,114,804 | B1 | 8/2015 | Shukla et al. | |
| 9,132,736 | B1 | 9/2015 | Shukla et al. | |
| 9,174,686 | B1 | 11/2015 | Messina et al. | |
| 9,216,856 | B2 | 12/2015 | Howell et al. | |
| 9,315,210 | B2 | 4/2016 | Sears et al. | |
| 9,376,102 | B1 | 6/2016 | Shukla et al. | |
| 9,387,985 | B2 | 7/2016 | Gillmore et al. | |
| 9,420,203 | B2 | 8/2016 | Broggi et al. | |
| 9,428,042 | B2 | 8/2016 | Morrow et al. | |
| 9,428,128 | B2 * | 8/2016 | Whitfield, Jr. | B65F 3/10 |
| 9,452,750 | B2 | 9/2016 | Shukla et al. | |
| 9,493,921 | B2 | 11/2016 | Amin et al. | |
| 9,656,640 | B1 | 5/2017 | Verhoff et al. | |
| 9,707,869 | B1 | 7/2017 | Messina et al. | |
| 9,821,789 | B2 | 11/2017 | Shukla et al. | |
| 9,880,581 | B2 | 1/2018 | Kuriakose et al. | |
| 9,882,820 | B2 | 1/2018 | Tanida et al. | |
| 10,029,556 | B2 | 7/2018 | Morrow et al. | |
| D843,281 | S | 3/2019 | Gander et al. | |
| 10,315,643 | B2 | 6/2019 | Shukla et al. | |
| 10,351,341 | B2 | 7/2019 | Whitfield et al. | |
| 10,392,000 | B2 | 8/2019 | Shukla et al. | |
| 10,414,067 | B2 | 9/2019 | Datema et al. | |
| 10,434,995 | B2 | 10/2019 | Verhoff et al. | |
| 10,457,134 | B2 | 10/2019 | Morrow et al. | |
| D869,332 | S | 12/2019 | Gander et al. | |
| D871,283 | S | 12/2019 | Gander et al. | |
| 10,544,556 | B2 | 1/2020 | Amin et al. | |
| D888,629 | S | 6/2020 | Gander et al. | |
| 10,703,356 | B2 * | 7/2020 | Lacroix | B60W 10/11 |
| 10,800,605 | B2 | 10/2020 | Rocholl et al. | |
| 10,843,379 | B2 | 11/2020 | Rocholl et al. | |
| 10,843,549 | B2 | 11/2020 | Morrow et al. | |
| D905,713 | S | 12/2020 | Linsmeier et al. | |
| 10,859,167 | B2 | 12/2020 | Jax et al. | |
| D907,544 | S | 1/2021 | Wall et al. | |
| 10,901,409 | B2 | 1/2021 | Datema et al. | |
| D909,934 | S | 2/2021 | Gander et al. | |
| 10,940,610 | B2 | 3/2021 | Clifton et al. | |
| 10,987,829 | B2 | 4/2021 | Datema et al. | |
| 10,997,802 | B2 | 5/2021 | Koga et al. | |
| 11,001,135 | B2 | 5/2021 | Yakes et al. | |
| 11,001,440 | B2 | 5/2021 | Rocholl et al. | |
| 11,007,863 | B2 | 5/2021 | Yakes et al. | |
| 11,021,078 | B2 | 6/2021 | Rocholl et al. | |
| 11,042,750 | B2 * | 6/2021 | Wildgrube | B65F 3/041 |
| 11,046,329 | B2 | 6/2021 | Clifton et al. | |
| 11,052,899 | B2 | 7/2021 | Shukla et al. | |
| 11,059,436 | B2 | 7/2021 | Wildgrube et al. | |
| 11,498,409 | B1 * | 11/2022 | Smith | B60K 17/00 |
| 2002/0159870 | A1 | 10/2002 | Pruteanu et al. | |
| 2003/0231944 | A1 | 12/2003 | Weller et al. | |
| 2004/0071537 | A1 | 4/2004 | Pruteanu et al. | |
| 2004/0156706 | A1 | 8/2004 | Weller et al. | |
| 2005/0113996 | A1 | 5/2005 | Pillar et al. | |
| 2006/0045700 | A1 | 3/2006 | Siebers et al. | |
| 2007/0088469 | A1 | 4/2007 | Schmiedel et al. | |
| 2007/0138817 | A1 | 6/2007 | Calliari et al. | |
| 2007/0154295 | A1 | 7/2007 | Kuriakose | |
| 2008/0038106 | A1 | 2/2008 | Spain | |

(56) References Cited

U.S. PATENT DOCUMENTS

| | | | | |
|---|---|---|---|---|
| 2008/0150350 | A1 | 6/2008 | Morrow et al. | |
| 2008/0237285 | A1 | 10/2008 | Calliari | |
| 2009/0194347 | A1 | 8/2009 | Morrow et al. | |
| 2010/0166531 | A1 | 7/2010 | Bauer et al. | |
| 2010/0301668 | A1 | 12/2010 | Yakes et al. | |
| 2012/0282077 | A1 | 11/2012 | Alberts et al. | |
| 2014/0097370 | A1* | 4/2014 | Whitfield, Jr. ............ | B65F 3/10 251/213 |
| 2017/0121108 | A1 | 5/2017 | Davis et al. | |
| 2017/0225888 | A1 | 8/2017 | Betz et al. | |
| 2017/0247186 | A1 | 8/2017 | Whitfield et al. | |
| 2017/0341860 | A1 | 11/2017 | Dodds et al. | |
| 2018/0129241 | A1 | 5/2018 | Kuriakose et al. | |
| 2018/0251297 | A1 | 9/2018 | Vasilescu et al. | |
| 2018/0265289 | A1 | 9/2018 | Davis et al. | |
| 2019/0039407 | A1 | 2/2019 | Smith | |
| 2019/0058930 | A1 | 2/2019 | Dunbar | |
| 2019/0071291 | A1 | 3/2019 | Puszkiewicz et al. | |
| 2019/0121353 | A1 | 4/2019 | Datema et al. | |
| 2019/0161272 | A1 | 5/2019 | Betz et al. | |
| 2019/0185077 | A1 | 6/2019 | Smith et al. | |
| 2019/0193934 | A1 | 6/2019 | Rocholl et al. | |
| 2019/0291711 | A1 | 9/2019 | Shukla et al. | |
| 2019/0322321 | A1 | 10/2019 | Schwartz et al. | |
| 2019/0344475 | A1 | 11/2019 | Datema et al. | |
| 2019/0351883 | A1 | 11/2019 | Verhoff et al. | |
| 2019/0360600 | A1 | 11/2019 | Jax et al. | |
| 2020/0031641 | A1 | 1/2020 | Puszkiewicz et al. | |
| 2020/0102145 | A1 | 4/2020 | Nelson et al. | |
| 2020/0230841 | A1 | 7/2020 | Datema et al. | |
| 2020/0230842 | A1 | 7/2020 | Datema et al. | |
| 2020/0262328 | A1 | 8/2020 | Nelson et al. | |
| 2020/0262366 | A1 | 8/2020 | Wildgrube et al. | |
| 2020/0265656 | A1 | 8/2020 | Koga et al. | |
| 2020/0316816 | A1 | 10/2020 | Messina et al. | |
| 2020/0317083 | A1 | 10/2020 | Messina et al. | |
| 2020/0346547 | A1 | 11/2020 | Rocholl et al. | |
| 2020/0346556 | A1 | 11/2020 | Rocholl et al. | |
| 2020/0346557 | A1 | 11/2020 | Rocholl et al. | |
| 2020/0346657 | A1 | 11/2020 | Clifton et al. | |
| 2020/0346854 | A1 | 11/2020 | Rocholl et al. | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346860 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0347661 | A1 | 11/2020 | Rocholl et al. | |
| 2020/0347857 | A1 | 11/2020 | Clifton et al. | |
| 2020/0348681 | A1 | 11/2020 | Clifton et al. | |
| 2020/0348764 | A1 | 11/2020 | Clifton et al. | |
| 2020/0398670 | A1 | 12/2020 | Rocholl et al. | |
| 2020/0398695 | A1 | 12/2020 | Rocholl et al. | |
| 2020/0398697 | A1 | 12/2020 | Rocholl et al. | |
| 2020/0398772 | A1 | 12/2020 | Wildgrube et al. | |
| 2020/0399057 | A1 | 12/2020 | Rocholl et al. | |
| 2020/0399058 | A1 | 12/2020 | Rocholl et al. | |
| 2020/0402325 | A1 | 12/2020 | Koga et al. | |
| 2021/0002112 | A1 | 1/2021 | Puszkiewicz et al. | |
| 2021/0031611 | A1 | 2/2021 | Yakes et al. | |
| 2021/0031612 | A1 | 2/2021 | Yakes et al. | |
| 2021/0031649 | A1 | 2/2021 | Messina et al. | |
| 2021/0054942 | A1 | 2/2021 | Jax et al. | |
| 2021/0069934 | A1 | 3/2021 | Rocholl et al. | |
| 2021/0086991 | A1 | 3/2021 | Betz et al. | |
| 2021/0088036 | A1 | 3/2021 | Schubart et al. | |
| 2021/0107361 | A1 | 4/2021 | Linsmeier et al. | |
| 2021/0124347 | A1 | 4/2021 | Datema et al. | |
| 2021/0143663 | A1 | 5/2021 | Bolton | |
| 2021/0162630 | A1 | 6/2021 | Clifton et al. | |
| 2021/0188076 | A1 | 6/2021 | Morrow et al. | |
| 2021/0213642 | A1 | 7/2021 | Datema et al. | |
| 2021/0221216 | A1 | 7/2021 | Yakes et al. | |
| 2021/0225095 | A1 | 7/2021 | Koga et al. | |
| 2021/0229320 | A1 | 7/2021 | Datema et al. | |
| 2021/0229755 | A1 | 7/2021 | Schwartz et al. | |
| 2021/0229908 | A1 | 7/2021 | Rocholl et al. | |

* cited by examiner

CONTROL SYSTEM FOR A REFUSE VEHICLE

CROSS-REFERENCE TO RELATED APPLICATION

This Application is a continuation of U.S. patent application Ser. No. 17/327,298, filed May 21, 2021, which claims priority to U.S. Provisional Patent Application No. 63/084,364, filed Sep. 28, 2020, the contents of which are hereby incorporated by reference in their entireties.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor.

SUMMARY

One exemplary embodiment relates to a refuse vehicle. The refuse vehicle includes a chassis, an energy storage device, a body, an electric power take-off system, and a disconnect. The energy storage device is supported by the chassis and is configured to provide electrical power to a prime mover. Activation of the prime mover selectively drives the refuse vehicle. The body is supported by the chassis and defines a receptacle for storing refuse. The electric power take-off system is coupled to at least one of the body and the chassis, and includes a motor that is configured to drive a hydraulic pump to convert electrical power received from the energy storage device into hydraulic power. The disconnect is positioned between the energy storage device and the electric power take-off system and is configured to selectively decouple the electric power take-off system from the energy storage device.

Another exemplary embodiment relates to a vehicle. The vehicle includes a chassis, an energy storage device, a body, an electric power take-off system, and a disconnect. The energy storage device is supported by the chassis and is configured to provide electrical power to a prime mover. Activation of the prime mover selectively drives the refuse vehicle. The body defines a storage compartment, and is supported by the chassis. The electric power take-off system is coupled to at least one of the body and the chassis, and includes a motor that is configured to drive a hydraulic pump to convert electrical power received from the energy storage device into hydraulic power. The disconnect is positioned between the energy storage device and the electric power take-off system and is configured to selectively decouple the electric power take-off system from the energy storage device.

Another exemplary embodiment relates to a refuse vehicle. The refuse vehicle includes a chassis, an energy storage device, a receptacle for storing refuse, an electric power take-off system, a lifting system, a compactor, and a disconnect. The energy storage device is supported by the chassis and is configured to provide electrical power to a prime mover. Activation of the prime mover selectively drives the refuse vehicle. The receptacle is supported by the chassis. The electric power take-off system is coupled to at least one of the chassis and the receptacle of the refuse vehicle, and includes a motor that is configured to drive a hydraulic pump to convert electrical power received from the energy storage device into hydraulic power. The lifting system is movable relative to the receptacle using hydraulic power from the electric power take-off system. The compactor is positioned within the receptacle and is movable relative to the on-board receptacle using hydraulic power from the electric power take-off system. The disconnect is positioned between the energy storage device and the electric power take-off system and is configured to selectively decouple the electric power take-off system from the energy storage device. When the motor is decoupled from the energy storage device by the disconnect, the hydraulic pump is disabled.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
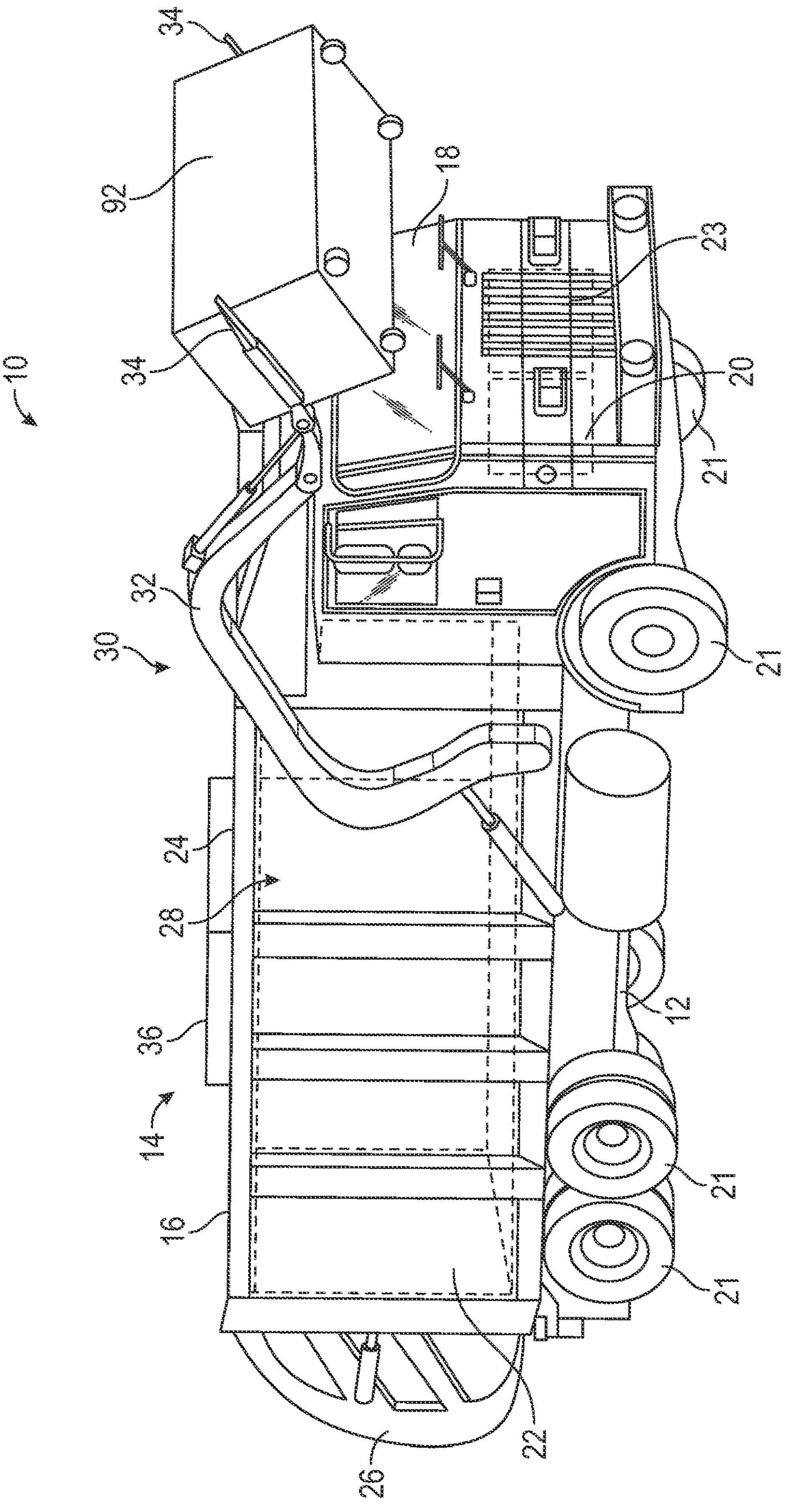
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for controlling an electric refuse vehicle. Electric refuse vehicles, or E-refuse vehicles, include an onboard energy storage device, like a battery, that provides power to a motor that produces rotational power to drive the vehicle. The energy storage device, which is typically a battery or series of batteries, can be used to provide power to different subsystems on the E-refuse vehicle as well. The energy storage device is also configured to provide hydraulic power to different subsystems on the E-refuse vehicle through an electric power take-off (E-PTO) device. The E-PTO receives electric power from the energy storage device and provides the electric power to an electric motor. The electric motor drives a hydraulic pump that provides pressurized hydraulic fluid to different vehicle subsystems, including the compactor and the lifting system.

The E-refuse vehicle includes a manual power disconnect to selectively couple the E-PTO to the energy storage device. The manual power disconnect allows a user to decouple the E-PTO from the energy storage device, which can be advantageous for a variety of reasons. For example, when a refuse route has been completed and the lifting system and compactor no longer need to be operated, a user can discontinue power transfer between the energy storage device and the E-PTO to limit the total energy use of the vehicle. Similarly, if the energy storage device is low, a user can disconnect the E-PTO to limit the electric power draw from the energy storage device so that the remaining battery life can be used exclusively to drive the vehicle. Similarly, if maintenance is being performed on the E-refuse vehicle, the manual power disconnect can allow the E-PTO to be locked out so that unwanted incidental operation is prevented and avoided.

Referring to FIGS. 1-3 and 11, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultra-capacitors, etc.), from an on-board generator (e.g., an internal combustion engine), or from an external power source (e.g., overhead power lines) and provide power to the systems of the refuse truck 10.

Figure 2:
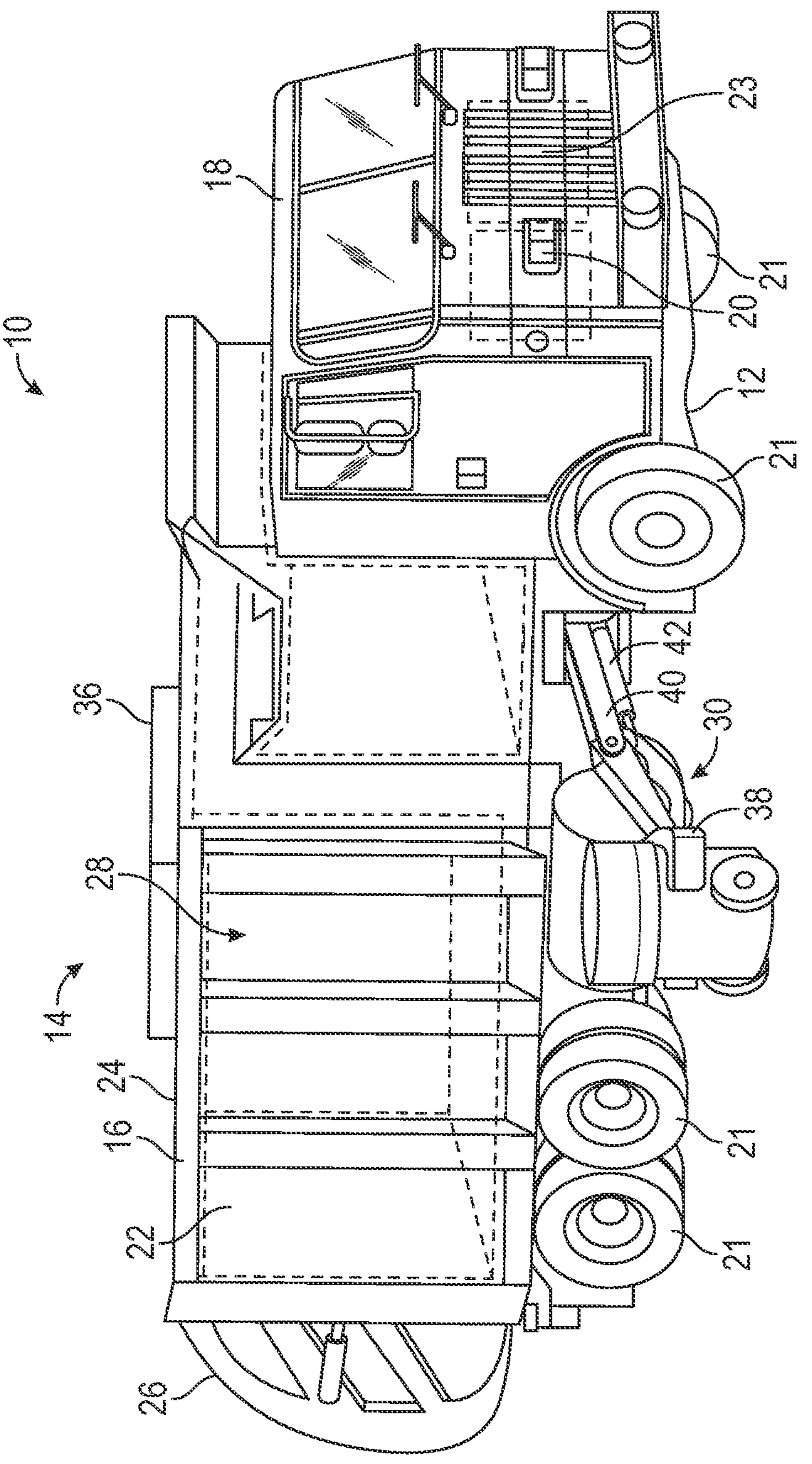
FIG. 2 is a perspective view of a side loading refuse vehicle according to an exemplary embodiment.
Figure 3:
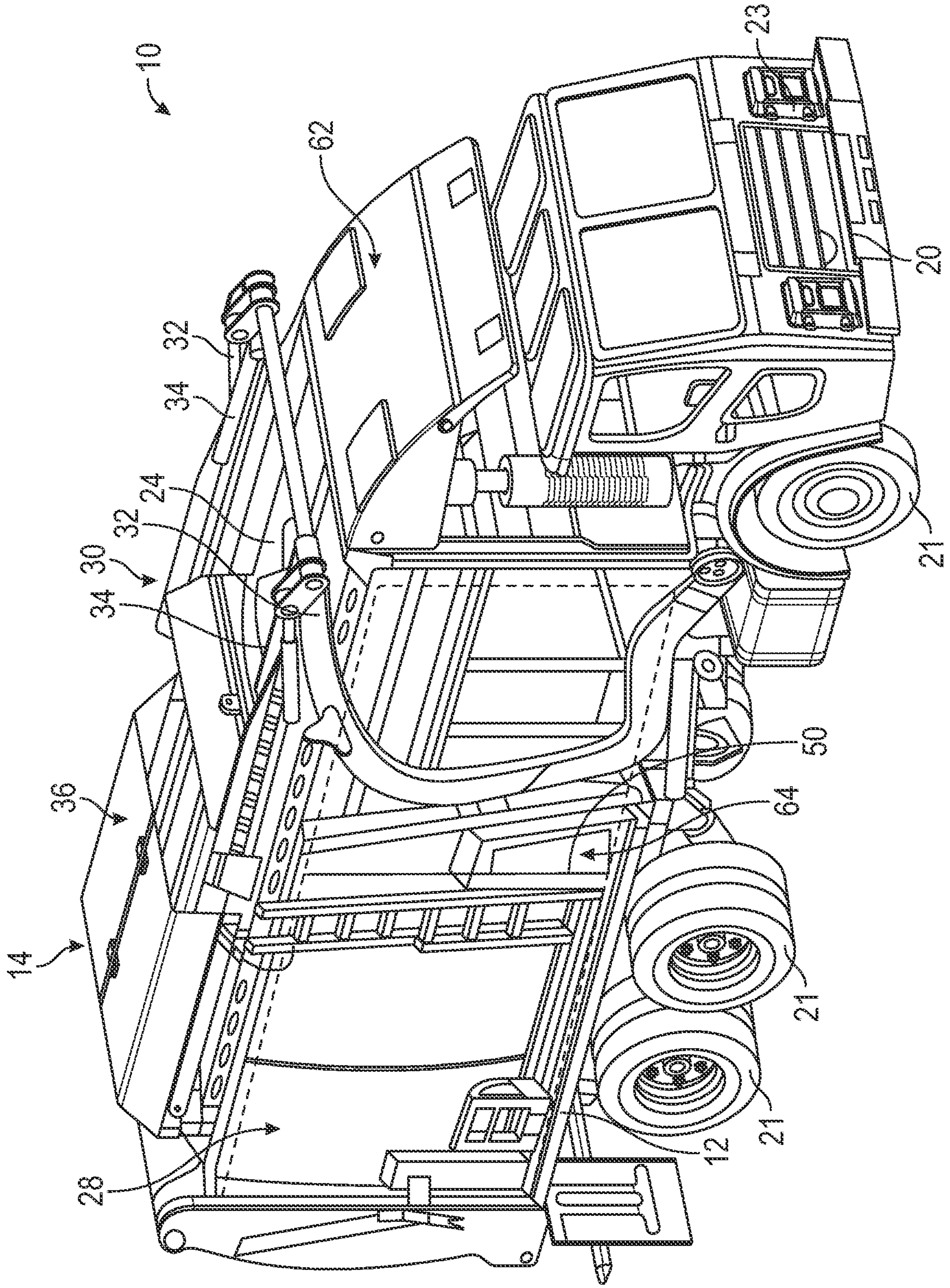
FIG. 3 is a front perspective view of an electric front loading refuse vehicle according to an exemplary embodiment.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 (e.g., a canopy or a lip) extend over or in front of a portion of the cab 18. According to the embodiment shown in FIGS. 1-3, the on-board receptacle 16 and collection chamber 28 are each positioned behind the cab 18. In some embodiments, the collection chamber 28 includes a hopper volume and a storage volume. Refuse is initially loaded into the hopper volume and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10).

Referring again to the exemplary embodiment shown in FIG. 1, the refuse truck 10 is a front-loading refuse vehicle. As shown in FIG. 1, the refuse truck 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). As shown in FIG. 1, the arms 32 are rotated to lift the refuse container over the cab 18. A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotationally clockwise or counterclockwise, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container 92, etc.). During operation of the refuse truck 10, the forks 34 are positioned to engage the refuse container (e.g., the refuse truck 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse truck 10, including additional electric motors, cab controls (e.g., climate controls, steering, lights, etc.), the lifting system 30, and/or the compactor 50, for example.

Figure 4:
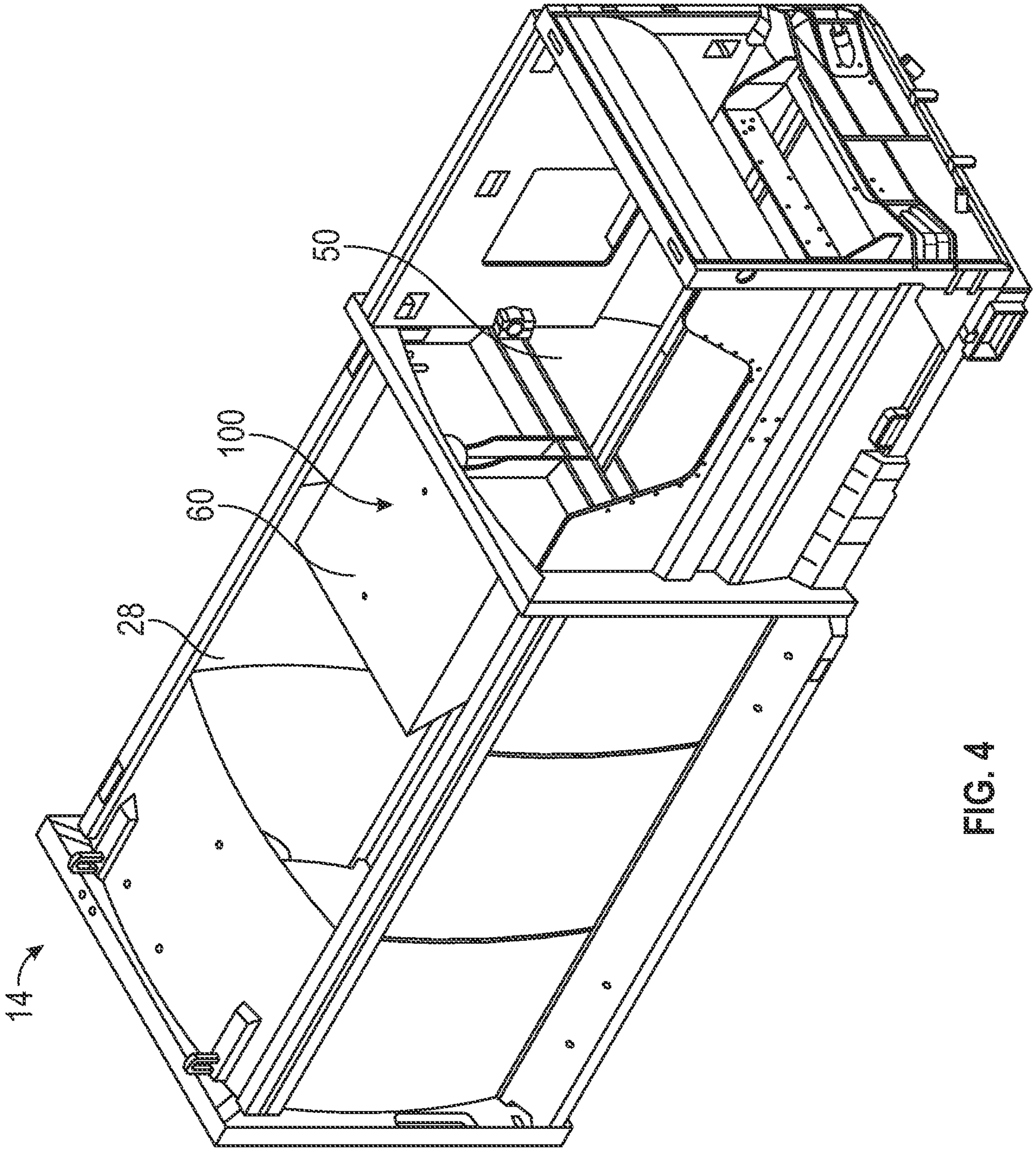
FIG. 4 is a top perspective view of a body assembly of the refuse vehicle of FIG. 3, according to an exemplary embodiment.
Figure 5:
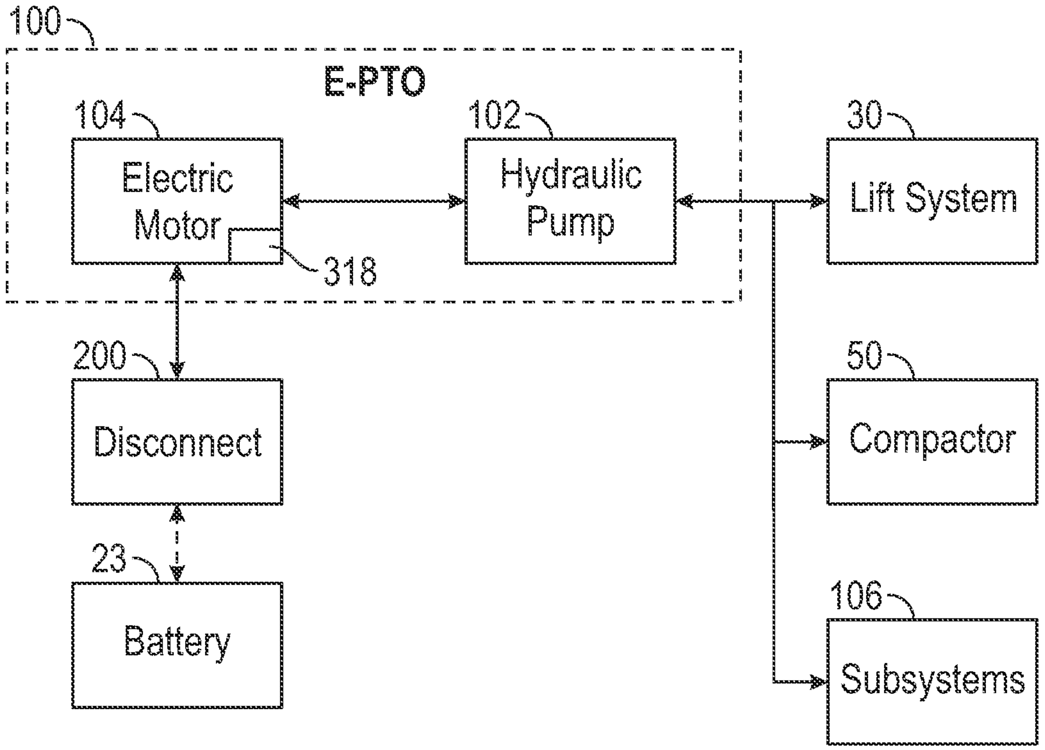
FIG. 5 is a schematic view of a control system of the refuse vehicle of FIG. 3.

The refuse truck 10 can be considered a hybrid refuse vehicle because it includes both electric and hydraulic power systems. As depicted in FIGS. 3-5, the refuse truck 10 includes an E-PTO system 100. The E-PTO system 100 is configured to receive electrical power from the batteries 23 and convert the electrical power to hydraulic power. In some examples, the E-PTO system 100 includes an electric motor driving one or more hydraulic pumps 102. The hydraulic pump 102 pressurizes hydraulic fluid from a hydraulic fluid reservoir onboard the refuse truck 10, which can then be supplied to various hydraulic cylinders and actuators present on the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 100 can be positioned about the refuse truck 10 in various different places. For example, the E-PTO system 100 may be positioned within a housing 60 above or within the on-board receptacle 16 (see FIG. 4), beneath a canopy 62 extending over a portion of the cab 18, or within a dedicated housing 64 alongside the vehicle body 14. Although the E-PTO system 100 may be in electrical communication with the batteries 23, the E-PTO system 100 can be separate from and spaced apart from the vehicle frame 12.

With continued reference to FIG. 5, the refuse truck 10 includes a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to the electric motor 104. Without electrical power from the batteries 23, the electric motor 104 will not drive the hydraulic pump(s) 102. Pressure within the hydraulic system will gradually decrease, such that none of the lifting system 30, compactor 50, or vehicle subsystems 106 relying upon hydraulic power will be functional. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain operational even when the E-PTO system 100 is not receiving electrical power from the batteries 23.

Figure 6:
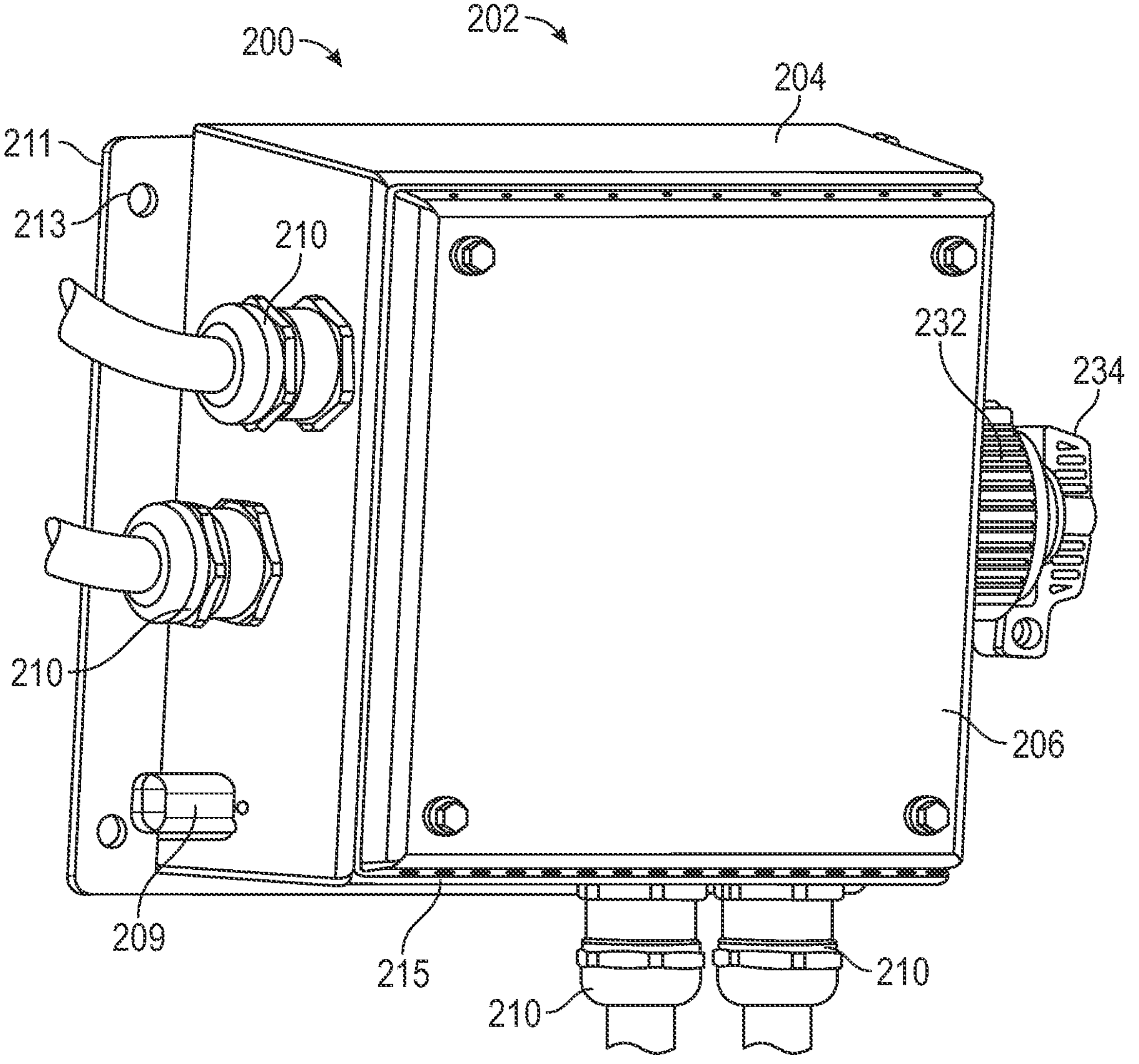
FIG. 6 is a perspective view of an electric power control box included within the control system of FIG. 5 and the refuse vehicle of FIG. 3.
Figure 7:
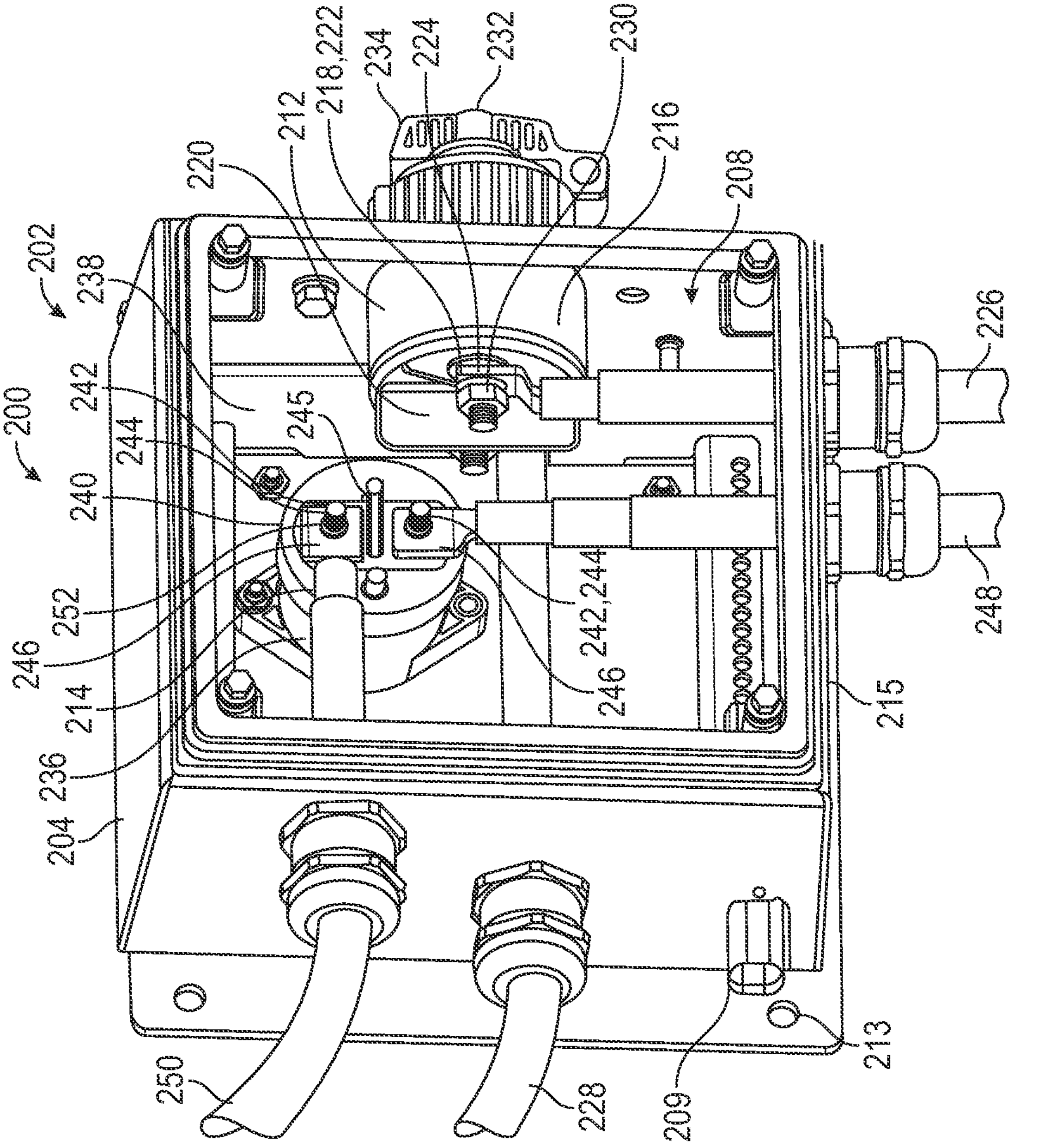
FIG. 7 is a perspective view of the electric power control box of FIG. 6 with a cover of the electric power control box removed.

FIGS. 6-7 depict an electric power control box 202 that can function as the disconnect 200. The electric power control box 202 generally includes a housing 204 and a cover or door 206 that together define a waterproof cavity 208. The waterproof cavity 208 receives and supports electrical connections between the E-PTO system 100 and the batteries 23 to create a selective electrical coupling between the two. Fittings 210 are positioned about the perimeter of the housing 204 and define passages through the housing 204 to receive electrical inputs. The fittings 210 can be rigidly coupled (e.g., welded) or removably coupled (e.g., threaded) to the housing 204 so that a water tight seal is formed between the fittings 210 and the housing 204. In some examples, a low voltage connector tube 209 extends through the housing 204 and into the cavity 208 as well. The housing 204 is configured to be mounted to the body 14 of the refuse truck 10. In some examples, the housing 204 is positioned within the cabinet housing 64 formed alongside the body 14. As depicted in FIGS. 6-7, the housing 204 includes a mounting flange 211 extending around at least a portion of the housing 204. The mounting flange 211 includes a plurality of mounting holes 213 that can be used to fasten the housing 204 to the body 14 of the refuse truck 10. In some examples, a vent 215 is formed within an underside of the housing 204 to allow cooling air to enter into the cavity 208.

Figure 8:
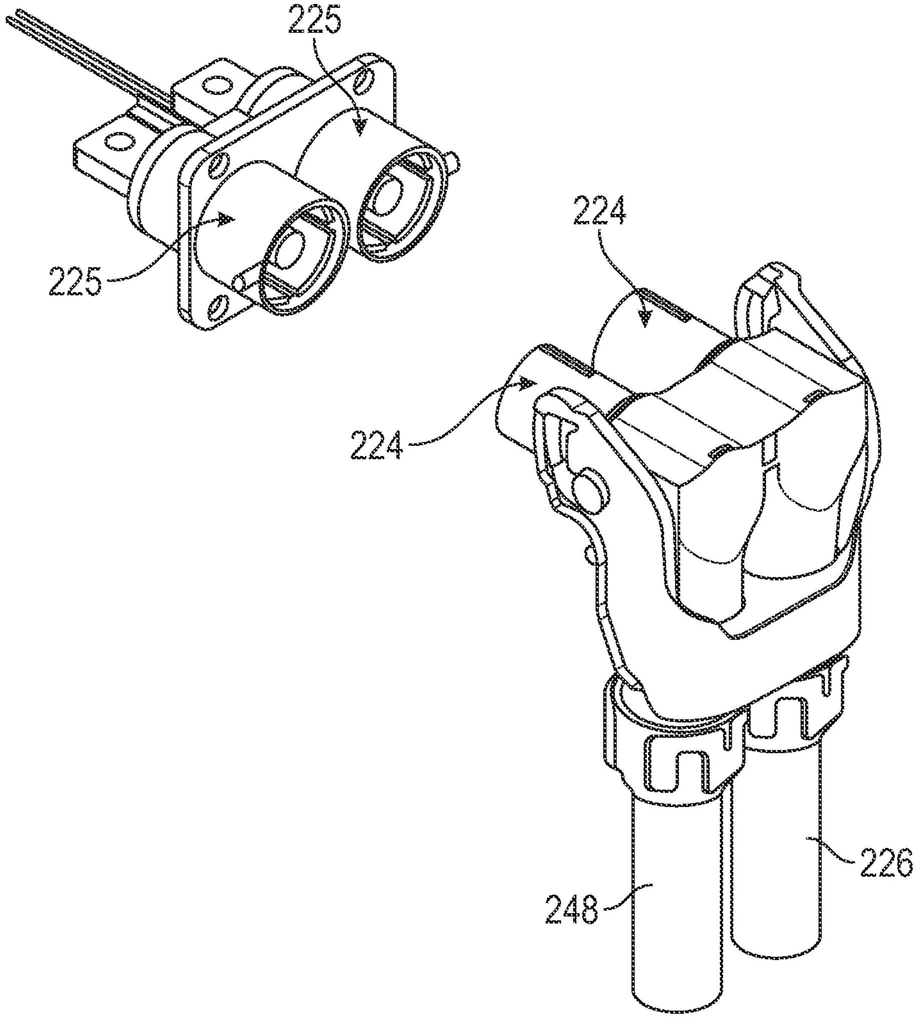
FIG. 8 is a perspective view of a plug that can be used within the electric power control box of FIG. 6.

The electric power control box 202 provides a positive terminal connection or bus 212 and a negative terminal connection or bus 214 to create an electrical coupling between the E-PTO system 100 and the batteries 23. As depicted in FIG. 7, the positive terminal bus 212 has a generally cylindrical body 216 and defines two distinct terminals 218 that are separated from one another by a dividing wall 220. In some examples, the terminals 218 are at least partially defined by threaded shanks 222 extending outward from the body 216 to receive and secure cable connectors 224 (e.g., ring terminals, two-pole high voltage connectors with integrated high voltage interlock loop as depicted in FIG. 8, etc.). For example, one of the threaded shanks 222 can receive the connector 224 that is coupled to a high voltage positive shielded cable 226 that is coupled to the batteries 23, while the other terminal 218 can receive the connector 224 that is coupled to a high voltage positive shielded cable 228 that extends to the E-PTO system 100. If the connectors 224 are formed as ring terminals, a nut 230 can be used to secure the connectors 224 in place on each respective terminal 218. An electrical coupling is then established between each cable 226, 228 and the positive terminal bus 212 by joining the conductive connectors 224 to the conductive shanks 222, which extend inward to an internal circuit within the cylindrical body 216, as explained in additional detail below. The dividing wall 220 can help prevent unwanted direct contact between the connectors 224 of the positive shielded cables 226, 228. In some examples, the connector 224 on the cable 228 can be formed so that the ring portion extends perpendicularly away from a longitudinal axis of the cable 228. Accordingly, the cable 228 can be coupled to the terminal 218 without bending or otherwise manipulating a shape of the cable 228.

The positive terminal bus 212 includes an externally accessible switch 232 that allows a user to manually control the electrical connections within the positive terminal bus 212. As depicted in FIG. 7, the cylindrical body 216 of the positive terminal bus 212 extends through and out of the housing 204. A waterproof cap 234 is hingedly coupled to an external end of the body 216 to provide selective access to a switch 232 within the body 216. As explained below, the switch 232 is movable between an open position and a closed position. In the closed position, the terminals 218 are electrically coupled to one another and electrical power transmitted through the cable 226 can be transferred through the positive terminal bus 212 to the cable 228 and to the E-PTO system 100. In the open position, the terminals 218 are electrically decoupled and electrical communication between the cables 226, 228 is blocked.

The negative terminal bus 214, like the positive terminal bus 212, includes a generally cylindrical body 236. The generally cylindrical body 236 is mounted (e.g., using fasteners) to a back wall 238 of the housing 204. In some examples, the cylindrical body 236 is coupled to a ground plate 240 that extends partially along the back wall 238 of the housing 204. The negative terminal bus 214 supports two terminals 242 that are again separated from one another by a dividing wall 245. The terminals 242 are again formed as threaded shanks 244 extending outward from the body 236 to receive and secure cable connectors 246 (e.g., ring terminals, two-pole high voltage connectors with integrated high voltage interlock loop as depicted in FIG. 8, etc.) As depicted in FIG. 7, one of the threaded shanks 244 receives a connector 246 that is coupled to a high voltage negative shielded cable 248 that is coupled to the batteries 23, while the other terminal 242 receives a connector 246 that is coupled to a high voltage negative shielded cable 250 that is coupled to the E-PTO system 100. If the connectors 246 are ring terminals, nuts 252 can be used to secure the connectors 246 in place on each respective terminal 242. With the nuts 252 securing the connectors 246 to the terminals 242, an electrical coupling is established between each cable 248, 250 and the negative terminal bus 214. The divider wall 245 can inhibit unwanted direct contact between the connectors 246, which in turn prevents unwanted direct contact between the cables 248, 250. Alternatively, each of the connectors 224, 246 can be formed as two-pole high voltage connectors with integrated high voltage interlock loops, as depicted in FIG. 8. The connector 224 can be plugged into female terminals 225 formed in the positive terminal bus 212 while the connector 246 can be plugged into female terminals 247 formed in the negative terminal bus 214.

Figure 9:
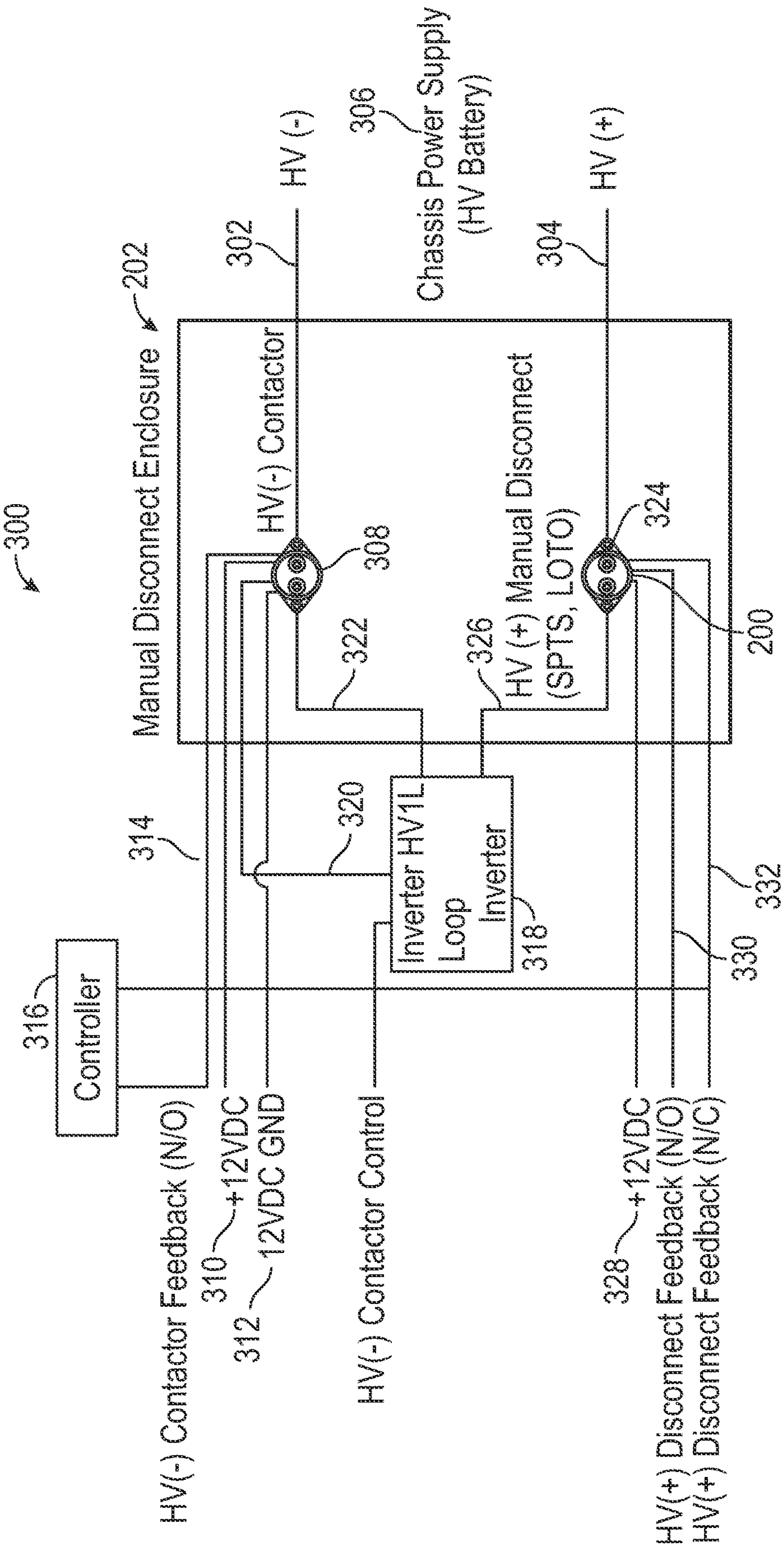
FIG. 9 is a schematic view of a circuit that can be used in and by the electric power control box of FIG. 6.
Figure 10:
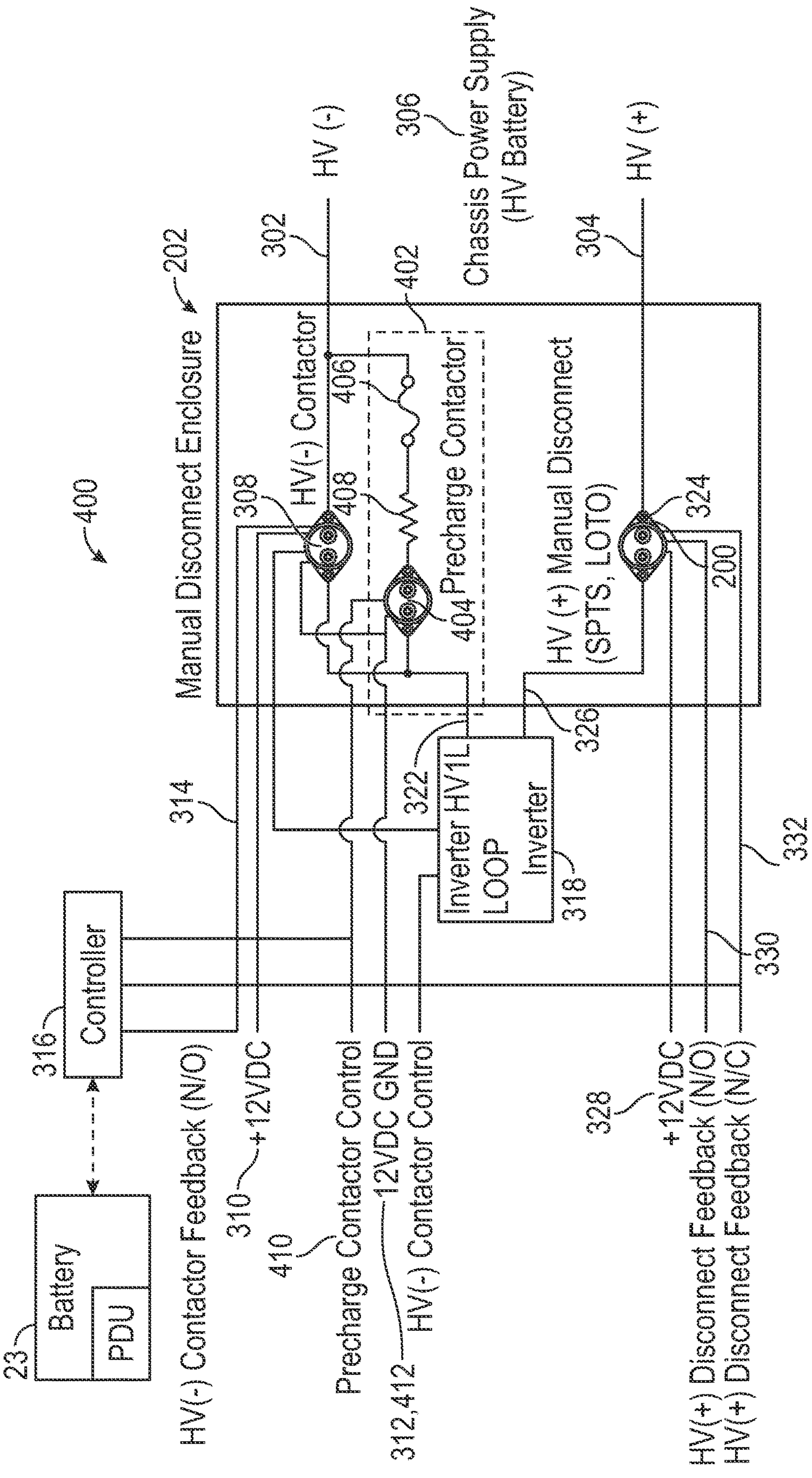
FIG. 10 is a schematic view of an alternative circuit that can be used in and by the electric power control box of FIG. 6.

With additional reference to FIGS. 9-10, the operation of the electric power control box 202 and disconnect 200 is described in additional detail with reference to the circuit 300. As depicted in FIG. 9, the electric power control box 202 includes high voltage inputs 302, 304 coming from the chassis battery power supply 306. The high voltage inputs 302, 304 can be the negative shielded cable 248 and the positive shielded cable 226, for example, that extend away from and supply electrical power from the batteries 23 (which can constitute the chassis battery power supply 306).

The high voltage input 302 is coupled to a negative high voltage contactor 308. In some examples, the negative terminal bus 214 serves as the negative high voltage contactor 308. The negative high voltage contactor 308 is electrically coupled to an auxiliary low voltage source 310 and to ground 312. In some examples, the auxiliary low voltage source 310 is a 12 V battery that is configured to toggle a contactor switch within the negative high voltage contactor 308 between an open position and a closed position. In the open position, the terminals 242 of the negative terminal bus 214 are electrically decoupled and in the closed position, the terminals 242 of the negative terminal bus 214 are electrically coupled to one another through the contactor switch. A negative contactor feedback line 314 coupled to a controller 316 can monitor and/or control the operation of the contactor switch. The negative contactor feedback line 314 can detect a welded contactor at system startup, and is configured to open immediately if a high voltage cable (e.g., high voltage outputs 322, 326) is unplugged from an inverter 318 of the E-PTO system 100. In some examples, the inverter 318 of the E-PTO system 100 is coupled to the negative high voltage contactor 308 using a wire 320. The wire 320 can be used to ground the inverter 318. A high voltage output 322, such as the negative shielded cable 250, is also coupled to the other terminal on the negative high voltage contactor 308. Accordingly, when the contactor switch is closed, electrical power can be transmitted from the high voltage input 302, through the negative high voltage contactor 308, and to the high voltage output 322. The high voltage output 322 can provide direct current (DC) power to the inverter 318, where it is inverted into alternating current (AC) power for use by the electric motor 104 or with additional components on the vehicle (e.g., vehicle lights, climate control systems, sensors, displays, cab controls, or other auxiliary systems within the refuse truck, etc.).

The high voltage input 304 is coupled to a positive high voltage contactor 324 that also serves as a manual disconnect. For example, the positive high voltage contactor 324 can be the positive terminal bus 212 shown and described with respect to FIGS. 6-7. The positive high voltage contactor 324 includes terminals (e.g., terminals 218) that receive the high voltage input 304 and a high voltage output 326. The high voltage input 304 can be the positive shielded cable 226 while the positive high voltage output 326 can be the positive shielded cable 228, for example. The positive high voltage output 326 is coupled to the inverter 318 so that DC electrical power is supplied from the batteries 23, through the positive high voltage contactor 324, to the inverter 318, which then transforms the DC power to AC power for use by the electric motor 104. A second auxiliary power source 328 can also be coupled to the positive high voltage contactor 324. The second auxiliary power source 328 can be a 12 V battery, for example. In some examples, the second auxiliary power source 328 is in communication with the controller 316 and is configured to receive instructions from the controller 316 to control a contactor switch within the positive high voltage contactor 324. The positive high voltage contactor 324 can also include one or more disconnect feedback lines 330, 332 that can monitor the status of the positive high voltage contactor 324 to provide information to one or more of the E-PTO system 100, the batteries 23, or the controller 316, for example. In some examples, the disconnect feedback lines 330, 332 are coupled to the disconnect 200 and are wired to a common power source (e.g., the second auxiliary power source 328). When the disconnect 200 is closed, the first disconnect feedback line 330 will have 12 V while the second disconnect feedback line 332 will have 0 V. When the disconnect 200 is opened, the first disconnect feedback line 330 will have 0 V and the second disconnect feedback line 332 will have 12 V. In some examples, the controller 316 provides a fault signal if both disconnect feedback lines 330, 332 carry the same voltage.

As indicated above, the positive high voltage contactor 324 includes a disconnect 200 that can manually open a contactor switch within the positive high voltage contactor 324 to decouple the terminals 218 and decouple the high voltage input 304 from the high voltage output 326. In some examples, the disconnect 200 is a single pole, single throw (SPST) switch that can be manually moved between an open position and a closed position. In the open position, the terminals 218 are decoupled from one another and electrical power cannot pass between the battery 23 to the E-PTO system 100 through the high voltage input 304 and the high voltage output 326. In the closed position, the terminals 218 are electrically coupled and electrical power from the battery 23 is supplied through the positive high voltage contactor 324 to the inverter 318 of the E-PTO system 100 to drive the electric motor 104. The disconnect 200 can be locked out in the open position, so that the E-PTO system 100 remains decoupled from the battery 23 when maintenance is being performed, for example.

Referring now to FIG. 10, another circuit 400 that can be used to control and operate the disconnect 200 and the electric power control box 202 is depicted. The circuit 400 differs from the circuit 300 in that a pre-charge circuit 402 and pre-charge contactor 404 are included within the electric power control box 202. The pre-charge circuit 402 is in selective electrical communication with the high voltage input 302 and the high voltage output 322 using a switch 406. In some examples, the switch 406 is controlled by the controller 316. The pre-charge circuit 402 further includes a resistor 408 in series with the switch 406. In some examples, the pre-charge contactor 404 is grounded by the ground line 412. The high voltage output 322 is electrically coupled to the pre-charge contactor 404 as well, and is configured to be energized by the high voltage input 302. As explained below, the pre-charge circuit 402 is designed to prevent high inrush currents that could otherwise damage the wiring or electrical connections within the disconnect 200.

Each of the circuits 300, 400 are designed to form a reliable and efficient selective electrical coupling between the battery 23 and the E-PTO system 100. The circuits 300, 400 are further designed to be integrated into refuse trucks 10 having different battery 23 types or systems so that the E-PTO system 100 can be incorporated into the vehicle. The circuits 300, 400 further allow a user to lock out and disable the E-PTO system 100 without affecting the rest of the refuse truck 10 functions, so that the refuse truck 10 can still be driven or otherwise operated independent of the E-PTO system 100 function. This operational mode can be useful when power conservation is necessary, such as when the batteries 23 have limited remaining power.

The controller 316 can initiate electrical power transfer between the batteries 23 and the E-PTO system 100. In some examples, the controller 316 monitors the position of the disconnect 200. For example, the controller 316 can receive information from one or more of the disconnect feedback lines 330, 332 to determine whether the disconnect 200 is in the open or closed position. If the controller 316 determines that the disconnect 200 is open, the controller 316 can issue a command to open the contactor switch within the negative high voltage contactor 308. The auxiliary low voltage source 310 can then toggle the contactor switch open. In some examples, the controller 316 also communicates with the battery 23 and associated circuit to open contactors associated with the battery 23 to further isolate the battery 23 from the E-PTO system 100. Similarly, the controller 316 can control the electric power control box 202 so that the contactor switch within the negative high voltage contactor 308 closes whenever the controller 316 determines that the disconnect 200 is closed.

The controller 316 communicates with the battery 23 (e.g., to a power distribution unit (PDU) of the chassis 12 in communication with the battery 23) to initiate the transmission of electrical power from the battery 23 to and through the electric power control box 202. In some examples, the controller 316 communicates a detected voltage at the inverter 318, which can indicate whether or not the disconnect 200 is open or closed. If the contactor switch within the negative high voltage contactor 308 is open, the controller 316 can communicate with the battery 23 to ensure that the contactor switches associated with the battery 23 are open as well. Accordingly, no high voltage will be provided from the battery 23 to the electric power control box 202. If the controller 316 requests the contactors within the PDU of the battery 23 to open, but confirmation that the contactors are open is not received by the controller 316, the controller 316 will prevent the negative high voltage contactor 308 and associated switch from closing. Closing the negative high voltage contactor 308 before pre-charging the negative high voltage high voltage contactor 308 could couple the battery 23 to the electric power control box 202 in a way that might otherwise cause an inrush current that could weld the contactors or even blow a main fuse within the inverter 318. Accordingly, this condition is preferably avoided by the controller 316 and the electric power control box 202, more generally.

Similarly, the controller 316 communicates with the battery 23 to indicate that the battery 23 can be joined with the E-PTO system 100 through the inverter 318 and the electric power control box 202. The controller 316 monitors the status of the electric power control box 202. Upon detecting that the disconnect 200 has been closed and receiving confirmation that the contactors within the battery 23 (e.g., the PDU) are open, the controller 316 closes the contactor within the negative high voltage contactor 308. The controller 316 then initiates a pre-charging process to provide an initial voltage on each of the high voltage input 302 and high voltage output 322. In some examples, the controller 316 controls the switch 406 to close, thereby closing the pre-charge circuit 402 and providing an initial voltage onto the high voltage input 302 and high voltage output 322. In some examples, the pre-charge circuit operates in conjunction with the auxiliary low voltage source 310, which can pass an initial charge at a lower voltage through to the inverter 318 to charge the capacitive elements within the inverter 318. Once the controller 316 detects that an appropriate pre-charge level has been reached within inverter 318 and along the high voltage input 302 and high voltage output 322, the controller 316 opens the switch 406 and closes the contactor switch within the negative high voltage contactor 308. The controller 316 then sends instructions to the battery 23 or PDU to open the battery contactor switches, thereby providing electrical power from the battery 23 to the E-PTO system. In some examples, the battery 23 and PDU include a pre-charge circuit 400, such that the pre-charging operation can be left to the battery 23.

Figure 12:
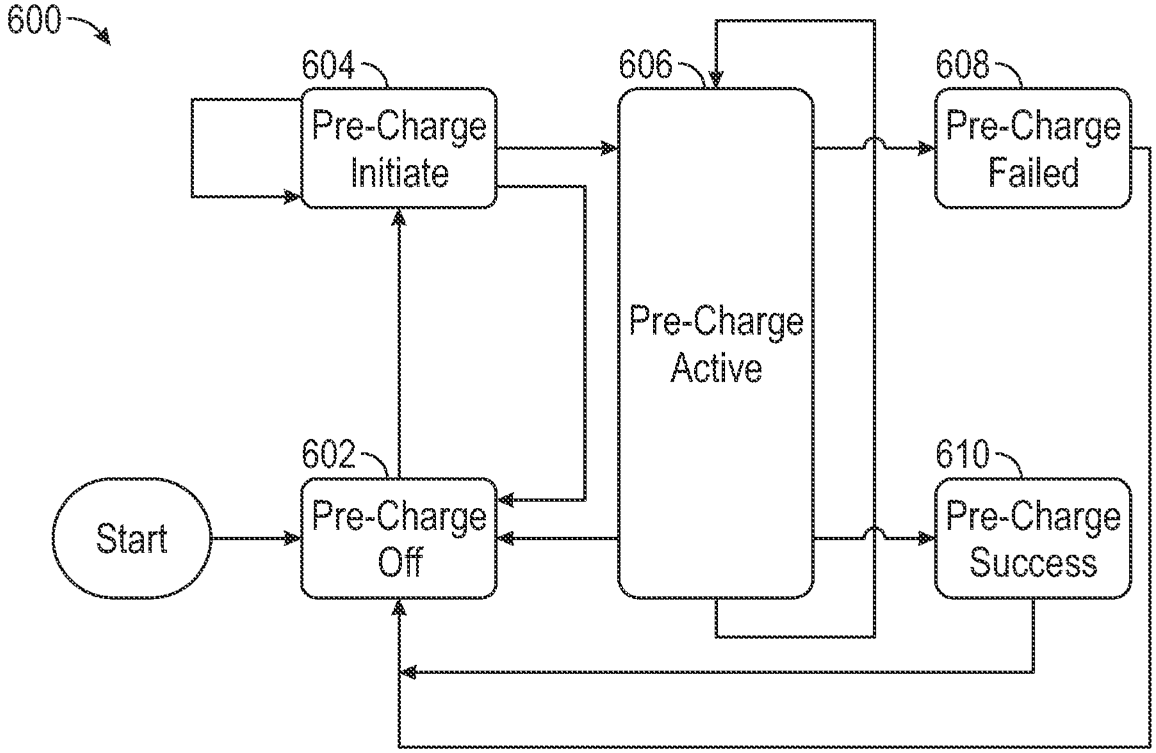
FIG. 12 is a flow chart depicting a method of operating a pre-charge circuit depicted in FIG. 10.
Figure 13:
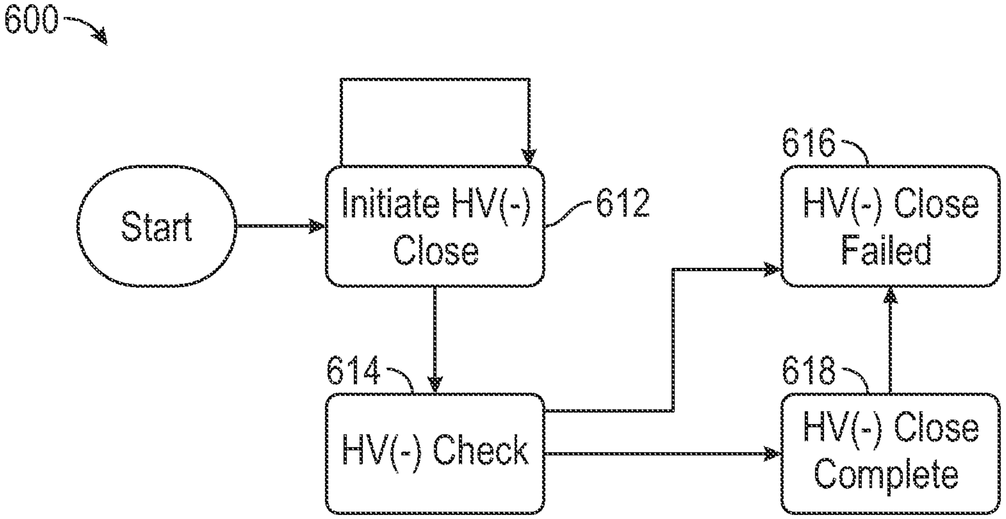
FIG. 13 is a flow chart depicting a method of operating the manual disconnect after performing a pre-charge operation using the method of FIG. 12.

Referring now to FIGS. 12-13, a method 600 of operating the pre-charge circuit 402 within the disconnect 200 is depicted. The method 600 can be performed by the controller 316, for example. The method 600 begins at step 602, where the ignition to the refuse truck 10 is off and the ignition to the refuse truck 10 has been off for a specified time period. In some examples, the specified time period for the refuse truck 10 to be “off” is about thirty seconds or more. Similarly, at step 602, the pre-charge circuit 402 is deactivated, such that no pre-charge is being provided.

At step 604, the ignition to the refuse truck 10 is turned on. Accordingly, at step 604, the ignition is on and the ignition to the refuse truck 10 has no longer been off for a specified time period. The pre-charge circuit 402 is then charged for a set time interval, so as to fully energize the pre-charge circuit 402. In some examples, the time allowed for the pre-charge circuit 402 to energize (i.e., the “pre-charge delay”) is approximately 2 seconds. At step 604, the controller 316 continues to evaluate whether the pre-charge delay has elapsed, and remains at step 604 until the full pre-charge delay has occurred or the ignition is turned off. If the ignition is turned off, the method returns to step 602.

If the ignition remains on and the pre-charge delay has elapsed, the controller 316 advances to step 606. If the disconnect 200 is in the closed position and the negative high voltage contactor 308 is open, a pre-charge timer is set to 0. A pre-charge output is turned on and the pre-charge circuit is fully activated. The controller 316 continues to monitor a status of the pre-charge circuit 402 at step 606 to ensure that appropriate electrical properties are observed. If the ignition is turned off, the disconnect 200 is opened during this step, or the pre-charge timer exceeds a maximum allotted time (e.g., exceeds a timeframe of 10 seconds, for example), the controller 316 deactivates the pre-charge circuit and returns to step 602.

If the controller 316 determines that the pre-charge timer exceeds the maximum allotted time or the pre-charge output is turned off at step 606 before completing the pre-charging process, the controller 316 proceeds to step 608, and issues a failure signal. The failure signal can take a variety of forms, and can prevent the battery 23 from being coupled with the E-PTO system 100. In some examples, the controller 316 can issue an alert to a user within the cab 18 that the E-PTO system 100 cannot be coupled with the battery 23. In still other examples, an alarm within the cab 18 is triggered. The controller 316 then returns to step 602.

If the controller 316 continues to observe the pre-charge circuit 402 operating at step 606, the controller 316 will continue to update the pre-charge timer. Once the components within the pre-charge circuit 402 reach a certain charge level, the pre-charge process is considered successful at step 610. For example, in some embodiments, the controller 316 monitors a voltage of the inverter 318. When the inverter 318 reaches a target voltage (e.g., about 550 Volts), and holds that voltage for a specified time period (e.g., 1 second), the pre-charge process is complete, and the E-PTO system 100 is ready to join the battery 23. If, alternatively, the ignition is turned off or the pre-charge output is discontinued at step 610, the method returns to step 602, and the pre-charge circuit is disconnected or otherwise discharged.

If the pre-charging process at step 610 proves successful, the method 600 advances to step 612, shown in FIG. 13. At step 612, the controller 316 begins to initiate the closing process for the negative high voltage contactor 308 to complete the circuit and couple the E-PTO system 100 with the battery 23. As the method advances to step 612, the ignition is on, the access door 206 to the electric power control box 202 is closed, and the disconnect 200 is in the closed position. At step 612, the controller 316 monitors a negative high voltage contactor timer, and counts down incrementally as the voltage within the pre-charge circuit is supplied to the negative high voltage contactor. In some examples, the negative high voltage contactor timer is initially set to 500 milliseconds, for example. Once the negative high voltage contactor timer reaches 0 (meaning pre-charge has been sufficiently supplied), the controller performs a negative high voltage contactor check at step 614.

If, at step 614, the controller 316 determines that the negative high voltage contactor 308 is still open, the method advances to step 616, where the negative high voltage contactor 308 closing process fails. The controller 316 determines the process has failed and can issue an alert or warning that the coupling process has not been completed. In some examples, the negative high voltage contactor 308 output switch is opened as well upon detecting a failure.

If the controller 316 instead determines that the negative high voltage contactor 308 is closed (e.g., by receiving a digital signal, for example), the method advances to step 618. The controller then commands the pre-charge circuit 402 to power down and communication between the battery 23 and E-PTO system 100 is completed. In some examples, the controller 316 continues to monitor the negative high voltage contactor 308 after coupling has been completed, as if the contactor opens, the process will fail and the method will proceed to step 616. Additionally, the method 600 will return to step 602 at any time during steps 612-618 if the access door 206 of the electric power control box 202 is opened, the manual disconnect 200 is moved to the open position, the negative high voltage contactor 308 is opened, or a motor on command is canceled. If such situations are detected, the negative high voltage contactor 308 will be disconnected such that no electrical power will be transmitted from the battery 23 and the negative high voltage contactor 308. In some examples, the controller 316 further monitors a negative high voltage contactor 308 enable signal, which is monitored during steps 612-618 of the method 600.

Using the previously described systems and methods, a refuse truck can be effectively outfitted with an E-PTO system that can convert electrical power to hydraulic power to provide pressurized hydraulic fluid to various subsystems on the vehicle. The E-PTO system includes a disconnect that allows the E-PTO system to be decoupled from the battery of the refuse truck so that the vehicle can be operated in a low power mode that allows the vehicle to drive while the lifting system, compactor, and/or other hydraulic systems are disabled. The disconnect can lock out the E-PTO system so that the E-PTO system is disconnected from any electrical power sources that might otherwise cause the inverter, electrical motor, or hydraulic pump to operate during a maintenance procedure. The disconnect can be a manual switch that can be readily accessed by a user to couple or decouple the E-PTO system from the battery of the vehicle.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and disconnect in isolation and incorporated into any type or variation of refuse vehicle.

Figure 11:
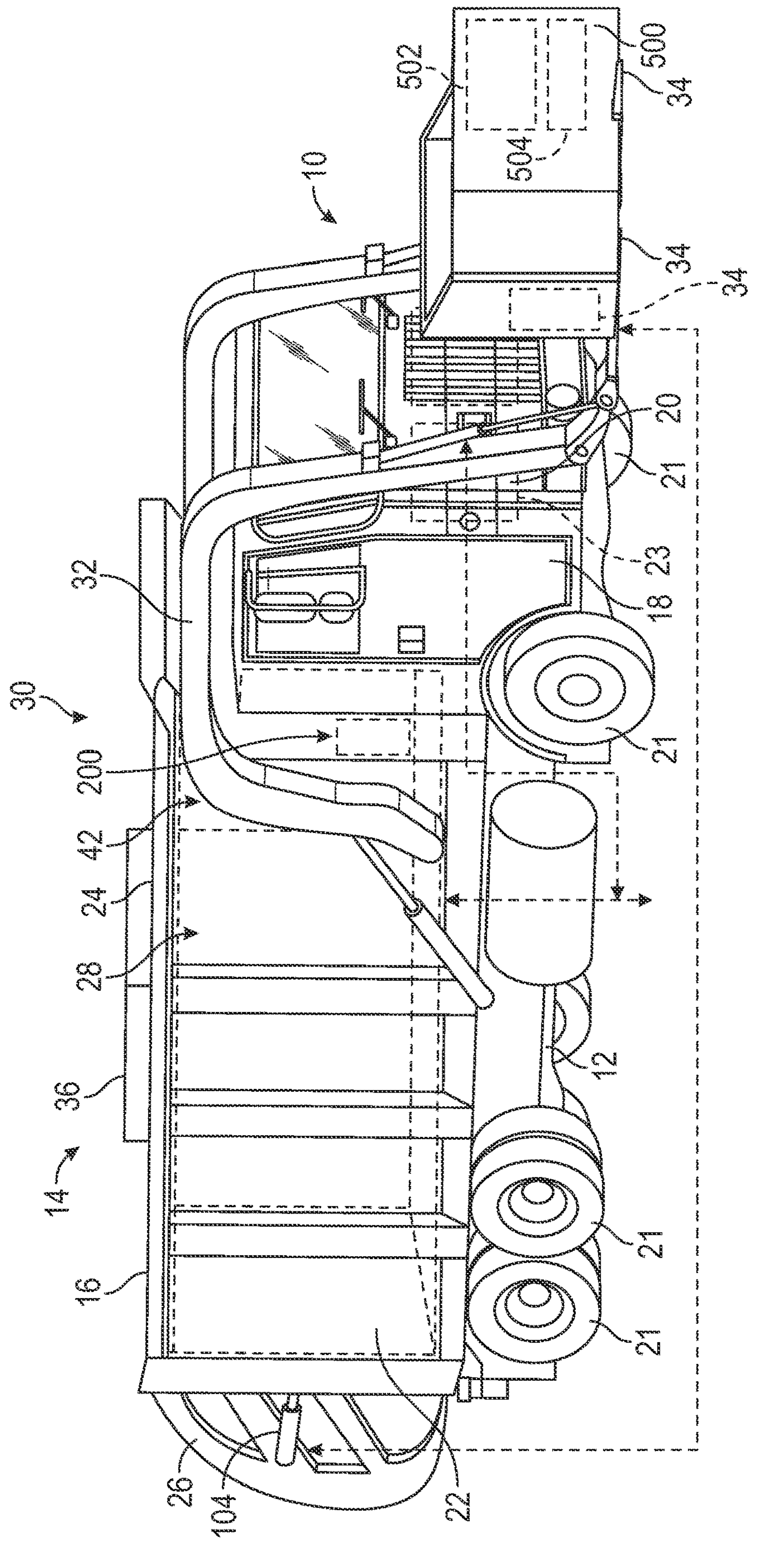
FIG. 11 is a perspective view of the front loading refuse vehicle of FIG. 1 coupled with a carry can device.

Additionally, the manual disconnect 200 discussed herein can be incorporated to selectively permit or block power transfer between systems other than the battery 23 and the E-PTO system 100. For example, and as depicted in FIG. 11, a disconnect 200 can be incorporated into a front-end loader (FEL) carry can 500. In some examples, the carry can 500 is configured to draw electrical power from the battery 23 using a wired connection or other coupling that creates electrical communication between the battery 23 and the carry can 500. The electricity supplied from the battery 23 to the carry can 500 can be used to operate the various lifting systems and other subsystems that may be present on the carry can 500. The disconnect 200 can selectively control and influence electrical communication that may otherwise occur through the forks 34 and the carry can 500 or through other wired connections that may normally couple the carry can 500 with the battery 23. The disconnect 200 may be positioned on either of the refuse truck 10 or on the carry can 500 in a location that permits manual actuation. In some examples, the carry can 500 includes its own onboard energy storage device 502 (e.g., a battery 502) that can be used to operate the carry can 500 when the carry can is disconnected from the battery 23 using the disconnect 200. Accordingly, the carry can 500 can continue to operate for a period of time even when no power from the primary battery 23 is being provided. In still other examples, the carry can 500 includes a controller 504 that is configured to detect a status of the two or more power sources coupled with the carry can 500 and power the carry can based upon which power supplies are currently providing power or currently able to provide power to the carry can 500. If electrical power from the battery 23 is available (e.g., the disconnect 200 is not tripped, the battery 23 has available power, etc.) the controller 504 will power the carry can 500 using electrical power from the battery 23. If the disconnect 200 is tripped and the connection between the battery 23 and the carry can 500 is disrupted (or if the battery 23 is in a lower power condition, etc.), the controller 504 will request power from the onboard energy storage device 502. In some examples, the disconnect 200 and/or controller 504 can supply electrical power from the onboard power supply 502 to the refuse vehicle 10 and/or the E-PTO system 100 if the battery 23 experiences unexpected failure or is in a low power condition. The disconnect 200 can selectively permit the transfer of electrical power from the carry can 500 to one or both of the battery 23 and the E-PTO system 100 to help drive the vehicle 10.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
- a chassis;
- an energy storage device supported by the chassis and configured to provide electrical power to a prime mover, wherein activation of the prime mover selectively drives the refuse vehicle;
- a body for storing refuse therein supported by the chassis;
- an electric power take-off system coupled to at least one of the body and the chassis, the electric power take-off system including a motor configured to drive a hydraulic pump and thereby convert electrical power received from the energy storage device into hydraulic power; and
- a disconnect positioned between the energy storage device and the electric power take-off system and configured to selectively decouple the electric power take-off system from the energy storage device.

2. The refuse vehicle of claim 1, wherein when the disconnect decouples the electric power take-off system from the energy storage device, the motor is decoupled from the energy storage device and the hydraulic pump is disabled.

3. The refuse vehicle of claim 2, wherein the electric power take-off system provides pressurized hydraulic fluid to a hydraulic cylinder, wherein the hydraulic cylinder operates a compactor within the body.

4. The refuse vehicle of claim 2, wherein the electric power take-off system provides pressurized hydraulic fluid to a hydraulic cylinder, wherein the hydraulic cylinder moves a lifting system relative to the body.

5. The refuse vehicle of claim 2, wherein the disconnect is an electric power control box having a housing, wherein the housing defines a waterproof cavity having a positive terminal bus and a negative terminal bus received therein.

6. The refuse vehicle of claim 5, wherein the positive terminal bus receives a first positive cable extending away from the energy storage device and a second positive cable extending away from the electric power take-off system.

7. The refuse vehicle of claim 6, wherein the negative terminal bus receives a first negative cable extending away from the energy storage device and a second negative cable extending away from the electric power take-off system.

8. The refuse vehicle of claim 2, wherein the disconnect includes a manual switch, the manual switch movable between a first position and a second position, wherein in the first position, an electrical connection is established between positive terminals of a positive terminal bus and wherein in the second position, the positive terminals of the positive terminal bus are electrically disconnected.

9. The refuse vehicle of claim 8, wherein the disconnect is configured to be locked in the second position.

10. The refuse vehicle of claim 1, wherein the electric power take-off system further comprises an inverter, wherein the inverter is configured to transform direct current from the energy storage device into alternating current to supply to the motor.

11. A vehicle comprising:
- a chassis;
- an energy storage device supported by the chassis and configured to provide electrical power to a prime mover, wherein activation of the prime mover selectively drives the vehicle;
- a body defining a storage compartment supported by the chassis;
- an electric power take-off system coupled to at least one of the body and the chassis, the electric power take-off system including a motor configured to drive a hydraulic pump and thereby convert electrical power received from the energy storage device into hydraulic power; and
- a disconnect positioned between the energy storage device and the electric power take-off system and configured to selectively decouple the electric power take-off system from the energy storage device.

12. The vehicle of claim 11, wherein when the disconnect decouples the electric power take-off system from the energy storage device, the motor is decoupled from the energy storage device and the hydraulic pump is disabled.

13. The vehicle of claim 12, further comprising a lifting system movable relative to the storage compartment using hydraulic power from the electric power take-off system.

14. The vehicle of claim 13, wherein the vehicle is a front end loading refuse truck.

15. The vehicle of claim 14, wherein the vehicle supports a carry can device, and wherein the disconnect is configured to electrically decouple the carry can from the energy storage device.

16. The vehicle of claim 11, wherein the electric power take-off system further comprises an inverter, wherein the inverter is configured to transform direct current from the energy storage device into alternating current to supply to the motor.

17. The vehicle of claim 11, wherein the disconnect includes a manual switch, the manual switch movable between a first position and a second position, wherein in the first position, an electrical connection is established between positive terminals of a positive terminal bus and wherein in the second position, the positive terminals of the positive terminal bus are electrically disconnected.

18. A refuse vehicle comprising:
- a chassis;
- an energy storage device supported by the chassis and configured to provide electrical power to a prime mover, wherein activation of the prime mover selectively drives the refuse vehicle;
- a receptacle for storing refuse therein supported by the chassis;
- an electric power take-off system positioned on the refuse vehicle, the electric power take-off system including a motor configured to drive a hydraulic pump and thereby convert electrical power received from the energy storage device into hydraulic power;
- a lifting system movable relative to the receptacle using hydraulic power from the electric power take-off system;
- a compactor positioned within the receptacle and movable relative to the receptacle using hydraulic power from the electric power take-off system; and
- a disconnect positioned between the energy storage device and the electric power take-off system and configured to selectively decouple the electric power take-off system from the energy storage device;

wherein when the motor is decoupled from the energy storage device by the disconnect, the hydraulic pump is disabled.

19. The refuse vehicle of claim 18, wherein the disconnect includes a manual switch, the manual switch movable between a first position and a second position, wherein in the first position, an electrical connection is established between positive terminals of a positive terminal bus and wherein in the second position, the positive terminals of the positive terminal bus are electrically disconnected.

20. The refuse vehicle of claim 18, further comprising a carry can associated with the lifting system and configured to receive electrical power from the energy storage device.

* * * * *